United States Patent
Hirth et al.

(10) Patent No.: US 10,900,400 B2
(45) Date of Patent: Jan. 26, 2021

(54) METHOD FOR OPERATING AN ELECTRICALLY HEATABLE CATALYST

(71) Applicant: CPT Group GmbH, Hannover (DE)

(72) Inventors: Peter Hirth, Rösrath (DE); Thomas Härig, Neunkirchen-Seelscheid (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 16/468,221

(22) PCT Filed: Dec. 11, 2017

(86) PCT No.: PCT/EP2017/082145
§ 371 (c)(1),
(2) Date: Jun. 10, 2019

(87) PCT Pub. No.: WO2018/108775
PCT Pub. Date: Jun. 21, 2018

(65) Prior Publication Data
US 2020/0011225 A1  Jan. 9, 2020

(30) Foreign Application Priority Data

Dec. 12, 2016 (DE) .................. 10 2016 224 711

(51) Int. Cl.
*F01N 3/20* (2006.01)
*H05B 1/02* (2006.01)
(Continued)

(52) U.S. Cl.
CPC ......... *F01N 3/2013* (2013.01); *F01N 3/2006* (2013.01); *F01N 3/2026* (2013.01);
(Continued)

(58) Field of Classification Search
CPC .. F01N 3/2013; F01N 3/2803; F01N 2330/30; F01N 2240/16; F01N 2550/22;
(Continued)

(56) References Cited

U.S. PATENT DOCUMENTS 5,588,291 A   12/1996  Maus
6,656,435 B1 * 12/2003  Bruck ............... F01N 3/0807
                                                    422/180

(Continued)

FOREIGN PATENT DOCUMENTS

CN    1723341    1/2006
CN    102112712  6/2011
(Continued)

OTHER PUBLICATIONS

International Search Report issued in corresponding Application No. PCT/EP2017/082145.
(Continued)

*Primary Examiner* — Hoang M Nguyen
(74) *Attorney, Agent, or Firm* — Cozen O'Connor

(57) ABSTRACT

A method for operating an electrically heatable catalytic converter in an exhaust tract of an internal combustion engine having at least one honeycomb body through which an exhaust-gas stream can flow, and having at least one electrically heatable heating conductor positioned upstream of the honeycomb body in a throughflow direction of the exhaust gas includes: applying an electrical current to the heating conductor such that the heating conductor is electrically heated in a manner dependent on an ambient temperature around the heating conductor; and electrically heating the heating conductor such that a dwell time of a temperature of the heating conductor is bounded in a temperature range defined by a first lower limit temperature $T_{G1U}$ and an upper limit temperature $T_{G1O}$.

10 Claims, 1 Drawing Sheet

(51) Int. Cl.
*F01N 11/00* (2006.01)
*F01N 9/00* (2006.01)
*F01N 3/28* (2006.01)

(52) U.S. Cl.
CPC ............... *F01N 9/00* (2013.01); *F01N 11/00* (2013.01); *H05B 1/0236* (2013.01); *H05B 1/0297* (2013.01); *F01N 3/2803* (2013.01); *F01N 2330/30* (2013.01)

(58) Field of Classification Search
CPC ......... F01N 2560/06; F01N 2900/0602; F01N 2900/12; F01N 2900/1404; F01N 2900/1602; F01N 3/2026; F01N 9/00; F01N 11/00; F01N 3/2006; H05B 1/0236; H05B 1/0297; Y02T 10/26; Y02T 10/47
USPC ................ 60/274, 285, 286, 297, 300, 303
See application file for complete search history.

(56) References Cited

U.S. PATENT DOCUMENTS

| | | | |
|---|---|---|---|
| 10,207,222 B2* | 2/2019 | Crawford | ............... B01D 53/94 |
| 2003/0017086 A1* | 1/2003 | Bruck | .................. F01N 3/2882 |
| | | | 422/168 |
| 2004/0101722 A1 | 5/2004 | Faye et al. | |
| 2007/0089402 A1* | 4/2007 | Bruck | ................. F01N 13/0097 |
| | | | 60/285 |
| 2014/0366509 A1 | 12/2014 | Hirth et al. | |
| 2017/0044947 A1* | 2/2017 | Ueda | ..................... F01N 13/009 |

FOREIGN PATENT DOCUMENTS

| | | |
|---|---|---|
| CN | 103089380 | 5/2013 |
| CN | 105545428 | 5/2016 |
| DE | 4241494 | 6/1994 |
| DE | 10 2009 012 094 | 9/2010 |
| EP | 0 839 996 | 5/1998 |
| JP | H 05-231135 | 9/1993 |
| WO | WO 2015/060014 | 4/2015 |
| WO | WO 2015/113732 | 8/2015 |

OTHER PUBLICATIONS

Written Opinion issued in corresponding Application No. PCT/EP2017/082145.

Office Action issued in corresponding German Application No. 10 2016 224 711.5.

* cited by examiner

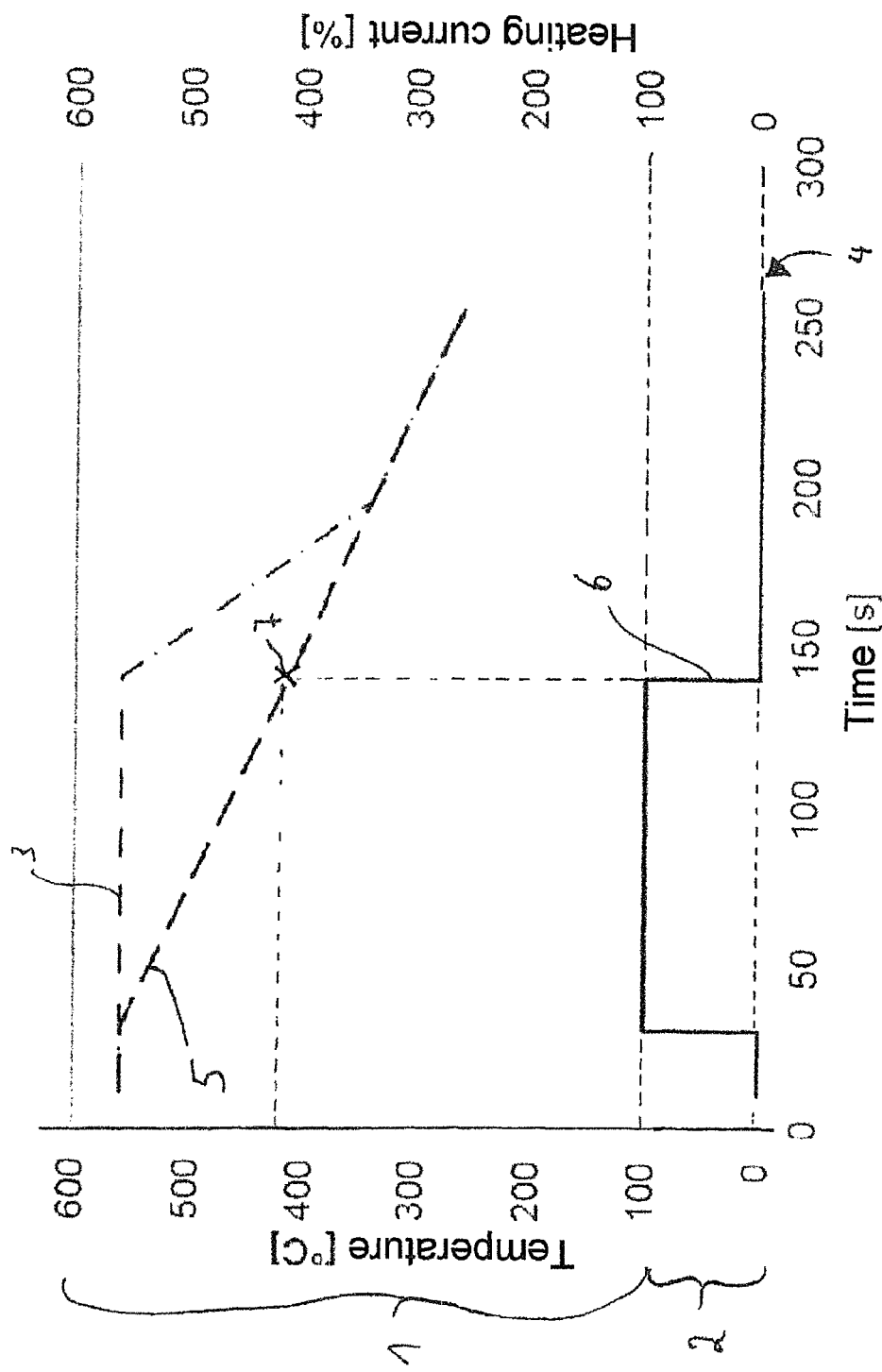

METHOD FOR OPERATING AN ELECTRICALLY HEATABLE CATALYST

CROSS REFERENCE TO RELATED APPLICATIONS

This is a U.S. national stage of International application No. PCT/EP2017/082145, filed on Dec. 11, 2017, which claims priority to German Application No. 10 2016 224 711.5, filed Dec. 12, 2016, the content of each of which is incorporated herein by reference.

BACKGROUND OF THE INVENTION

1. Field of the Invention

The invention relates to a method for operating an electrically heatable catalytic converter in an exhaust tract of an internal combustion engine.

2. Description of the Prior Art

For use in exhaust tracts of internal combustion engines, use is made of exhaust-gas aftertreatment systems such as, for example, catalytic converters. Depending on their specific construction and the materials used, these require different temperature windows in order to ensure an optimum conversion of the exhaust gas. In particular at the start of the operation of the internal combustion engine, the temperature at the catalytic converter is generally lower than the optimum operating temperature. To achieve the fastest possible heating of the exhaust gas and thus also of honeycomb bodies of the catalytic converter, electric heating systems are known which warm the flowing exhaust gas. For this purpose, heating conductors are used which are flowed through by an electrical current and which are heated utilizing the ohmic resistance.

Depending on the construction, material selection and the respectively present material structure, heating conductors have different, variable resistance values. The temperature of the heating conductor also has an influence on the actual resistance value. This has the result that the heating power in the presence of a given electrical current flow can change in the presence of changing boundary conditions. A change in the resistance of a heating conductor results in a change of the electrical currents flowing through the heating conductor, too, which can lead to a fault message in the electrical system of a motor vehicle. Furthermore, a situation may arise in which the electrical current consumption for heating to a defined temperature is greater than the available quantity of current, which, in particular in a motor vehicle, is greatly limited.

A disadvantage of the electric heating systems known in the prior art is, in particular, that changes in the material structure of the heating conductor can occur as a result of the operation of the motor vehicle or of the internal combustion engine, whereby the resistance value of the heating conductor can be changed. The associated changes in the resistance value are not predictable with sufficient accuracy, such that a situation may arise in which the heating power of the heating conductor changes in a range outside the predefined limits.

SUMMARY OF THE INVENTION

It is therefore an object of the present invention to provide a method that makes it possible for the change in the resistance value of a heating conductor in an exhaust tract to be identified in targeted fashion and limited by suitable countermeasures.

In accordance with a first aspect of the invention, a method is provided for operating an electrically heatable catalytic converter in an exhaust tract of an internal combustion engine having at least one honeycomb body through which an exhaust-gas stream can flow, and having at least one electrically heatable heating conductor positioned upstream of the honeycomb body in a throughflow direction of the exhaust gas, wherein heating of the heating conductor is realized by application of an electrical current to the heating conductor, wherein the heating conductor is electrically heated in a manner dependent on the ambient temperature around the heating conductor, wherein the heating conductor is electrically heated such that the dwell time of the temperature of the heating conductor is bounded in a temperature range defined by a first lower limit temperature $T_{G1U}$ and an upper limit temperature $T_{G1O}$.

The ambient temperature of the heating conductor is, in the unheated state, as a first approximation, influenced in particular by the exhaust-gas temperature of the exhaust gas flowing through the exhaust tract, for which reason the exhaust-gas temperature and the ambient temperature around the heating conductor are substantially identical or at least very similar. This applies at least for as long as the internal combustion engine is operated. After the shutdown of the internal combustion engine, exhaust gas no longer flows through the exhaust tract, for which reason the ambient temperature around the heating conductor is then influenced substantially by the still-warmed structures such as, for example, the housing of the catalytic converter. The ambient temperature describes the temperature in the direct surroundings of the heating conductor. The most intense exchange of heat takes place with these direct surroundings, such that the heating conductor releases its heat into this region when electric heating takes place, and absorbs heat therefrom when, owing to the flowing exhaust gas, the surroundings are at a higher temperature level than the heating conductor itself.

The heating conductor is utilized to warm the exhaust gas flowing in the exhaust line, by virtue of the fact that the exhaust gas flows past the warmed heating conductor. In this way, it is firstly possible for the optimum temperature for the operation of the catalytic converter to be reached earlier, and secondly, by targeted temperature control of the heating conductor and thus also, in a manner dependent thereon, of the honeycomb body and of the exhaust gas, an undesired structure conversion of the heating conductor or of the honeycomb body can be avoided.

Specifically, what is involved here is the effect that arises in particular in metallic materials when these materials are subjected to particular temperatures or temperature profiles. By the heating to above a material-specific minimum temperature and the subsequent slow cooling through a predefined temperature window, an at least temporarily enduring change of the material structure can occur in the case of metallic materials. This change in the material structure also has an effect on the specific ohmic resistance of the material. A change in the ohmic resistance in relation to the original ohmic resistance preplanned through the material selection and dimensioning can lead to the heating power of the heating conductor in the presence of a known electrical current being higher or lower than originally planned. Since the limits for the available electrical current, and also the temperatures to be attained as a result of the heating, are defined very exactly by the customer, such an unintended structure conversion can result in the heating taking place outside the limits predefined by the customer. In order to create a permanently functioning electric heating system, it is therefore necessary for the undesired change in the ohmic resistance of the heating conductor and/or of the honeycomb body to be minimized or preferably prevented entirely. Alternatively, it is necessary for at least a method to be provided which permits a retroformation of the structure conversion in order to permit the operation of the electric heating system in the limits actually intended.

In a manner dependent on the material, there is a temperature window defined by a first lower limit temperature $T_{G1U}$ and an upper limit temperature $T_{G1O}$ and in which the structure conversion of the respective material occurs when the material passes too slowly through this temperature window. This is caused by the processes that take place in the crystal structure of the metal during a temperature change. Specifically, what is involved here is the formation of the so-called alpha-prime phase.

The so-called alpha-prime phase is known from the literature in the context of the iron-carbon diagram. This phase is characterized by the formation of a specific metal structure. The alpha-prime phase results in embrittlement of the ferritic phase of the metal alloy. The alpha-prime phase preferably forms below about 500 degrees Celsius. This alpha-prime phase can be redissolved or retroformed by renewed heat treatment. The exact temperature ranges are in this case specific to the material specifically used in each case. The principle of the formation of the alpha-prime phase and the dissolution thereof is however generally the same.

If the temperature of the material passes too slowly through the temperature window, the formation of the disadvantageous material structure can occur. By active heating, it can be ensured that a defined temperature window is passed through only briefly, or at least the dwell time in the defined temperature window is sufficiently short, such that, in particular, the temperature transient as the temperature window is passed through is sufficiently high.

A temperature transient is to be understood as meaning a change in the temperature over time. Alternatively, the expression "temperature gradient" can also be found for this in the technical literature. The changeability of the temperature, is for example, stated as a change in Kelvin per minute [K/min] and relates substantially to a defined cooling from a predefined temperature level to a lower temperature level.

The method can advantageously be applied in the case of materials and in particular in the case of steels that have a chromium content of ≥10% and an aluminum content of ≤11%. Here, use is particularly preferably made of steels with a chromium content of ≥19%, such as, for example, 1.4410 and 1.4362. Furthermore, the method may also advantageously be applied to alloys which are used in particular for electric heating conductors. These include, for example, the steels 1.4765 or 1.4767 and closely related types of steel with a similar composition.

In the case of the advantageous materials mentioned above, the first lower limit temperature $T_{G1U}$ lies at approximately 380 degrees Celsius. Here, the first upper limit temperature $T_{G1O}$ preferably lies at 530 degrees Celsius.

It is particularly advantageous if the temperature transient of the temperature of the heating conductor when passing through the defined temperature range from a high temperature to a low temperature does not undershoot a predefined limit value.

This is advantageous because the excessively long dwell time in the temperature window, or the excessively slow passage through the temperature window, causes the structure conversion and thus the formation of the alpha-prime phase. It is therefore particularly advantageous if the defined temperature window is passed through as rapidly as possible, but at least more quickly than a lower limit value.

It is particularly preferable if, in the case of parameters for $T_{G1U}$ and $T_{G1O}$ as stated above, a cooling transient DT/Dt of ≥10 K/min is sought. A cooling transient of ≥100 to 1000 K/min is particularly advantageous here. This has the effect that the cooling takes place particularly quickly, whereby the temperature window, which is to be regarded as critical, is passed through very quickly and thus no sufficient dwell time arises in which the alpha-prime phase, which is to be avoided, could form.

It is also advantageous if the temperature of the heating conductor is, by the electric heating, kept above the upper limit temperature $T_{G1O}$ if the ambient temperature around the heating conductor lies below the upper limit temperature $T_{G1O}$ but lies above a second lower limit temperature $T_{G2U}$.

This is advantageous for preventing the temperature of the heating conductor falling, owing to the cooling exhaust gas and thus the cooling surroundings of the heating conductor, and slipping into the predefined temperature window in which the structure conversion, in particular the formation of the alpha-prime phase, begins.

It is basically unavoidable that the temperature of the heating conductor runs through the critical temperature window during the cooling of the exhaust gas and of the surroundings of the heating conductor, for example owing to the shutdown of the internal combustion engine. It is however the aim of the method according to an aspect of the invention that the dwell time in the temperature window is as short as possible, or the cooling takes place quickly enough that the critical temperature window is passed through as quickly as possible without a structure conversion taking place.

At an operating point of the internal combustion engine with relatively low load, less exhaust gas is emitted into the exhaust tract, whereby the temperature at the heating conductor falls. If the new, lower ambient temperature now lies below the upper limit temperature $T_{G1O}$ but above a second lower limit temperature $T_{G2U}$, this has the effect that, relatively speaking, the heating conductor cools more slowly than if the ambient temperature lay, for example, below the second lower limit temperature $T_{G2U}$. As a result, the dwell time in the critical temperature window is lengthened, because the temperature transient of the cooling of the heating conductor is lower.

To now prevent the temperature of the heating conductor from lying in the critical temperature window for an unduly long period of time, or the cooling taking place too slowly, the heating conductor is preferably electrically heated and thus kept at a temperature level above the upper limit temperature $T_{G1O}$ in order to prevent the structure conversion. After the temperature of the surroundings of the heating conductor has fallen sufficiently far below a second lower limit temperature $T_{G2U}$, the electric heating can be deactivated, because the delta between the temperature of the heating conductor and the ambient temperature around the heating conductor is large enough to ensure an adequately fast fall of the temperature of the heating conductor through the critical temperature window. The temperature transient of the cooling is in this case high enough to prevent the formation of the alpha-prime phase.

In the case of the above-mentioned materials, such as in particular the steels 1.4410 and 1.4362 or similar types of steel with a chromium content of greater than 10% or preferably greater than 19% and an aluminum content of less than 11%, a second lower limit temperature $T_{G2U}$ of approximately 300 degrees Celsius is advantageous. The temperature difference between the first lower limit temperature $T_{G1U}$ and the second lower limit temperature $T_{G2U}$ is thus large enough to achieve sufficiently fast cooling, and thus an adequately high cooling transient, when the heating is ended when the second lower limit temperature $T_{G2U}$ is undershot.

In one aspect, the electric heating of the heating conductor is ended if the ambient temperature of the heating conductor has undershot the second lower limit temperature $T_{G2U}$. This is advantageous to ensure that a sufficiently high temperature transient can be attained such that the formation of the alpha-prime phase, and thus the change in the metal structure that influences the ohmic resistance, is prevented.

It is also preferable if the second lower limit temperature $T_{G2U}$ is lower than the first lower limit temperature $T_{G1U}$. This is necessary in order to ensure that a sufficiently high temperature transient is attained to attain a sufficiently steep temperature gradient below the first lower limit temperature $T_{G1U}$.

It is moreover advantageous if the heating conductor is, by the electric heating, kept above the upper limit temperature $T_{G1O}$ for a predefinable duration. By virtue of the temperature of the heating conductor being capped at a high level above the upper limit temperature $T_{G1O}$, the structural conversion in the event of too slow a passage through the critical temperature window can be avoided. Furthermore, by the targeted warming and holding of the temperature, a formation of the alpha-prime phase that has already occurred can be reversed, such that the original material characteristics are attained again.

It is furthermore advantageous if the electric heating is ended when the ambient temperature around the heating conductor is below the second lower limit temperature $T_{G2U}$ for a predefined time. This is advantageous to ensure that the heating is ended only when the temperature in the surroundings of the heating conductor has lain below the second lower limit temperature $T_{G2U}$ for a certain minimum duration. In this way, it is ensured that, in any case, a sufficiently high temperature transient during the cooling of the heating conductor through the critical temperature range is attained.

It is also expedient if the electric heating of the heating conductor is ended when the temperature difference between the surroundings of the heating conductor and the present temperature of the heating conductor exceeds a predefinable value. If the temperature difference between the heating conductor and its surroundings is large enough, it can be assumed that the cooling rate or the temperature transient is sufficiently high to prevent the formation of the alpha-prime phase in the critical temperature range.

Is furthermore advantageous if, by a prediction element, a statement regarding the expected change in the ambient temperature around the heating conductor is output, and the electric heating of the heating conductor is performed in a manner dependent on the change of the ambient temperature as predicted by the prediction element.

This is advantageous because a prediction of the expected temperatures at the heating conductor is made possible, whereby the activation and the deactivation of the electric heating can be performed in a more effective manner. It would, for example, be possible for the prediction element to collect data regarding the present and the future operating point of the internal combustion engine, whereby it would be possible to make a statement regarding the expected temperature development. It can also be envisaged that the prediction element, on the basis of topographical data, for example from the navigation unit, in conjunction with the present position and the planned driving route, makes a statement regarding how the internal combustion engine will be operated in the foreseeable future. The heating of the heating element can advantageously be adapted to this also. If, for example, the prediction element identifies a gradient lying ahead, it can be inferred that the internal combustion engine will be operated with a relatively high load, as a result of which increasing exhaust-gas temperatures and thus also increasing temperatures at the heating element or at the honeycomb body of the catalytic converter can be expected.

By a prediction of the future temperature development, the decision as to whether or not electric heating should be performed can be made more effectively. Here, electric heating would, for example, make no sense if it is predicted by the prediction element that the temperature of the exhaust gas and thus of the surroundings of the heating element or of the heating element itself will rise again in any case in the near future.

It is furthermore expedient if, in the event of the ambient temperature being expected to remain below the second lower limit temperature $T_{G2U}$, the electric heating of the heating conductor is ended. This is advantageous because a structural conversion is not to be expected if the temperature lies below the second lower limit temperature $T_{G2U}$. Heating may, however, nevertheless be performed at any time for other reasons. If no heating of the heating element is taking place at this time, the heating will not be ended, but rather also remains inactive.

It is furthermore preferable if, by the first lower limit temperature $T_{G1U}$ and the upper limit temperature $T_{G1O}$, a temperature range is defined in which, owing to the action of heat, the material of the heating conductor undergoes a conversion of the material structure that leads to a change in the specific resistance of the heating conductor. As already described further above, the formation of the alpha-prime structure can adversely affect the ohmic resistance of the heating conductor, which can impair the functionality. The formation of the alpha-prime phase should therefore be substantially prevented, or the alpha-prime structure should be retroformed if it has formed already.

Advantageous refinements of the present invention are described in the following description of the FIGURES.

BRIEF DESCRIPTION OF THE DRAWINGS

The invention will be explained in detail in the following text with reference to the drawing. In the drawing:

The FIGURE shows a diagram in which, in the upper region, the temperature of the heating conductor is illustrated versus the time, and in the lower region, the heating current conducted through the heating conductor is illustrated versus the time.

DETAILED DESCRIPTION OF THE PRESENTLY PREFERRED EMBODIMENTS

The FIGURE shows a diagram divided into an upper region 1 and a lower region 2. In the upper region 1, the temperature 3 of a heating conductor is illustrated versus the time 4, which is plotted along the X axis. The exhaust-gas temperature 5 is also illustrated versus the time 4.

In the lower region 2 of the diagram, the heating current 6 applied to the heating conductor is illustrated versus the time 4. The heating current 6 is illustrated with the value 0% if no current is flowing and with the value 100% if current is flowing.

Proceeding from a starting temperature of approximately 550 degrees Celsius at the heating conductor and the flowing exhaust gas, the heating is deactivated, and no current flows through the heating conductor. Owing, for example, to a decreasing load on the internal combustion engine, the exhaust-gas temperature 5 falls over the course of the following time. If the heating conductor were now not heated, the temperature of the heating conductor would consequently fall correspondingly to the exhaust-gas temperature or with a slight offset with respect thereto. Owing to the relatively low temperature transient of the cooling, a structure conversion and formation of the alpha-prime phase could occur in the heating conductor.

To prevent this, the heating of the heating conductor is commenced at approximately 30 seconds to keep the temperature 3 of the heating conductor at a constant high level and prevent entry into the temperature range of the structure conversion.

During this time, the exhaust-gas temperature 5 continues to fall approximately linearly, whereby the temperature delta between the temperature 3 of the heating conductor and the exhaust gas 5 is increased. The heating of the heating conductor is maintained until the exhaust-gas temperature has fallen to the level of a lower limit temperature $T_{G2U}$ 7. Proceeding from this time, the temperature delta between the temperature 3 of the heating conductor and the temperature 5 of the exhaust gas is large enough to realize sufficiently fast cooling of the heating conductor in the case of which the formation of the alpha-prime phase is prevented.

Subsequently, the temperature 3 of the heating conductor likewise begins to fall. As shown in the FIGURE, after the ending of the heating, the temperature 3 of the heating conductor falls with a considerably higher transient than the exhaust-gas temperature 5. Owing to the higher transient of the temperature 3 of the heating conductor, it is achieved that the temperature window in which the formation of the alpha-prime phase preferably occurs is passed through in a significantly shorter time than in the case of the exhaust-gas temperature 5. The formation of the alpha-prime phase in the heating conductor is thus greatly reduced or even prevented entirely.

The diagram of the FIGURE shows a specific situation in which heating of the heating conductor is performed in order to maintain a certain minimum temperature level, so as not to enter the temperature range of the structure conversion. Only when the temperature delta between the temperature of the heating conductor and the surroundings is large enough to ensure that a sufficiently high temperature transient can be attained during the cooling is the heating stopped. The temperature of the heating conductor subsequently falls quickly enough to pass through the temperature range of the structure conversion without actually undergoing a structure conversion.

The usage situation described by the FIGURE is exemplary, and is not of a limiting nature.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating an electrically heatable catalytic converter in an exhaust tract of an internal combustion engine having at least one honeycomb body through which an exhaust-gas stream can flow, and having at least one electrically heatable heating conductor positioned upstream of the honeycomb body in a throughflow direction of the exhaust gas, the method comprising:
applying an electrical current to the heating conductor such that the heating conductor is electrically heated in a manner dependent on an ambient temperature around the heating conductor; and
electrically heating the heating conductor such that a dwell time of a temperature of the heating conductor is bounded in a temperature range defined by a first lower limit temperature $T_{G1U}$ and an upper limit temperature $T_{G1O}$,
wherein a temperature transient of the temperature of the heating conductor when passing through the defined temperature range from a higher temperature to a lower temperature does not undershoot a predefined limit value.

2. The method as claimed in claim 1, wherein the temperature of the heating conductor is, by the electric heating, kept above the upper limit temperature $T_{G1O}$ if the ambient temperature around the heating conductor lies below the upper limit temperature $T_{G1O}$ but lies above a second lower limit temperature $T_{G2U}$.

3. The method as claimed in claim 2, wherein the electric heating of the heating conductor is ended if the ambient temperature of the heating conductor has undershot the second lower limit temperature $T_{G2U}$.

4. The method as claimed in claim 3, wherein the second lower limit temperature $T_{G2U}$ is lower than the first lower limit temperature $T_{G1U}$.

5. The method as claimed in claim 2, further comprising maintaining, by the electric heating, the heating conductor above the upper limit temperature $T_{G1O}$ for a predefinable duration.

6. The method as claimed in claim 5, further comprising ending the electric heating if the ambient temperature around the heating conductor is below the second lower limit temperature $T_{G2U}$ for a predefined time.

7. The method as claimed in claim 1, further comprising ending the electric heating of the heating conductor if a temperature difference between surroundings of the heating conductor and a present temperature of the heating conductor exceeds a predefinable value.

8. The method as claimed in claim 2, further comprising outputting, by a prediction element, a statement regarding a predicted change in the ambient temperature around the heating conductor, and performing the electric heating of the heating conductor in a manner dependent on the predicted change of the ambient temperature around the heating conductor.

9. The method as claimed in claim 8, further comprising, ending the electric heating of the heating conductor in the event the ambient temperature around the heating conductor is predicted to remain below the second lower limit temperature $T_{G2U}$.

10. The method as claimed in claim 1, further comprising defining, by the first lower limit temperature $T_{G1U}$ and the upper limit temperature $T_{G1O}$, a temperature range in which, due to action of heat, material of the heating conductor undergoes a conversion of material structure that leads to a change in the specific resistance of the heating conductor.

* * * * *